(12) United States Patent
Salter et al.

(10) Patent No.: US 11,701,950 B2
(45) Date of Patent: Jul. 18, 2023

(54) SLIDABLE VEHICLE CROSSBAR AND OPERATING METHOD

(71) Applicant: Ford Global Technologies, LLC, Dearborn, MI (US)

(72) Inventors: Stuart C. Salter, White Lake, MI (US); William Wurz, San Francisco, CA (US); David Brian Glickman, Southfield, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/408,989

(22) Filed: Aug. 23, 2021

(65) Prior Publication Data
US 2023/0055433 A1    Feb. 23, 2023

(51) Int. Cl.
*B60J 7/04*    (2006.01)

(52) U.S. Cl.
CPC .................................... *B60J 7/041* (2013.01)

(58) Field of Classification Search
CPC . B60J 7/02; B60J 7/041; B60P 7/0815; B60P 7/15; B60R 9/10; B60R 9/06; B60R 2011/004; B62D 33/0207
USPC ............................................................ 296/3
See application file for complete search history.

(56) References Cited

U.S. PATENT DOCUMENTS

| | | | |
|---|---|---|---|
| 5,494,327 A * | 2/1996 | Derecktor | B60P 3/40 224/544 |
| 7,530,614 B2 | 5/2009 | Nichols | |
| 9,586,629 B2 | 3/2017 | Leitner | |
| 10,131,286 B2 * | 11/2018 | Jimenez Hernandez | B60R 9/045 |
| 10,525,863 B2 * | 1/2020 | Marchlewski | B60P 3/07 |
| 11,208,041 B2 * | 12/2021 | Pereira | G06V 10/25 |
| 2002/0048495 A1 * | 4/2002 | Anderson | B60P 7/0815 410/104 |
| 2003/0184110 A1 * | 10/2003 | Voves | B60R 9/00 296/37.6 |
| 2013/0181023 A1 | 7/2013 | Shawanda | |
| 2019/0225166 A1 * | 7/2019 | Williams | B62D 33/023 |
| 2019/0367101 A1 * | 12/2019 | McFadden | B62D 33/0207 |
| 2019/0389392 A1 * | 12/2019 | Pacella | B60R 9/06 |

(Continued)

FOREIGN PATENT DOCUMENTS

| | | | | |
|---|---|---|---|---|
| GB | 2436819 A | * | 10/2007 | ................ B60P 7/15 |
| GB | 2436820 B | | 3/2008 | |
| JP | H11130265 A | * | 5/1999 | |

OTHER PUBLICATIONS

Machine translation of JP-H 11130265-A.*

*Primary Examiner* — Dennis H Pedder
*Assistant Examiner* — Kevin P Weldon
(74) *Attorney, Agent, or Firm* — Vichit Chea; Carlson, Gaskey & Olds, P.C.

(57) ABSTRACT

A vehicle assembly includes, among other things, a cargo bed of a vehicle, a passenger side rail mounted to a passenger side wall assembly of the cargo bed, and a driver side rail mounted to a driver side wall assembly of the cargo bed. A crossbar is slidably coupled to the passenger and driver side rails. The crossbar is slidable along the passenger and driver side rails between a forward position and a rearward position. The crossbar is closer to a cab of the vehicle when the crossbar is in the forward position than when the crossbar is in the rearward position.

15 Claims, 6 Drawing Sheets

(56) References Cited

U.S. PATENT DOCUMENTS

| | | | |
|---|---|---|---|
| 2021/0078644 A1* | 3/2021 | Farren | B60Q 1/28 |
| 2021/0086703 A1* | 3/2021 | Huisman | B60P 7/0815 |
| 2022/0177053 A1* | 6/2022 | Green | B62D 33/0207 |
| 2022/0242210 A1* | 8/2022 | Williams | B60L 8/003 |

* cited by examiner

SLIDABLE VEHICLE CROSSBAR AND OPERATING METHOD

TECHNICAL FIELD

This disclosure relates generally to a crossbar of a vehicle and, more particularly, to a crossbar that spans a cargo bed and is slidable between forward and rearward positions.

BACKGROUND

Many vehicles, such as pickup trucks, include a cargo bed. Various structures have been utilized in connection with the cargo bed to help secure and manage loads within the cargo bed.

SUMMARY

A vehicle assembly according to an exemplary aspect of this disclosure includes, among other things, a cargo bed of a vehicle, a passenger side rail mounted to a passenger side wall assembly of the cargo bed, and a driver side rail mounted to a driver side wall assembly of the cargo bed. A crossbar is slidably coupled to the passenger and driver side rails. The crossbar is slidable along the passenger and driver side rails between a forward position and a rearward position. The crossbar is closer to a cab of the vehicle when the crossbar is in the forward position than when the crossbar is in the rearward position.

In another exemplary embodiment of the foregoing assembly, the passenger and driver side wall assemblies each have an inner side, an outer side, and an upper side. The passenger side rail is mounted directly to the inner side of the passenger side wall assembly. The driver side rail is mounted directly to the inner side of the driver side wall assembly.

In another exemplary embodiment of any of the foregoing assemblies, the passenger side rail and the driver side rail are disposed vertically beneath the upper sides of the passenger and driver side wall assemblies.

Another exemplary embodiment of any of the foregoing assemblies includes a control module and an actuator assembly. The control module is configured to control the actuator assembly to reposition the crossbar.

In another exemplary embodiment of any of the foregoing assemblies, the control module is configured to control the actuator assembly to position the crossbar vertically above a vertically highest point of a load held within the cargo bed.

Another exemplary embodiment of any of the foregoing assemblies includes a radar device configured to scan the load to reveal information identifying the vertically highest point of the load.

In another exemplary embodiment of any of the foregoing assemblies, the radar device is disposed on the crossbar.

Another exemplary embodiment of any of the foregoing assemblies includes at least one light mounted to the crossbar. The at least one light is configured to illuminate the cargo bed.

Another exemplary embodiment of any of the foregoing assemblies includes reinforcement structures within the passenger side wall between the inner and outer sides of the passenger side wall. The assembly additionally includes reinforcement structures within the driver side wall between inner and outer sides of the driver side wall.

In another exemplary embodiment of any of the foregoing assemblies, the reinforcement structures within the passenger side wall and within the driver side wall are installable from outside the cargo bed.

Another exemplary embodiment of any of the foregoing assemblies includes a passenger side mounting bracket and a driver side mounting bracket secured to opposing end portions of the crossbar. The passenger side mounting bracket has a portion slidably received within the passenger side rail. The driver side mounting bracket has a portion slidably received within the driver side rail.

In another exemplary embodiment of any of the foregoing assemblies, the crossbar has a U-shape profile.

A vehicle crossbar operating method according to another exemplary aspect of the present disclosure includes the step of slidably coupling a crossbar to both a passenger side rail and a driver side rail. The passenger side rail is mounted to an inner side of a passenger side wall assembly. The driver side rail is mounted to an inner side of a driver side wall assembly. The method further includes sliding the crossbar along the passenger and driver side rails between a forward position and a rearward position. The crossbar is closer to a cab of a vehicle when the crossbar is in the forward position than when the crossbar is in the rearward position.

Another exemplary embodiment of the foregoing method includes sliding the crossbar over a cargo bed of the vehicle when moving the crossbar between the forward position and the rearward position.

In another exemplary embodiment of any of the foregoing methods, the crossbar has a U-shape profile.

Another exemplary embodiment of any of the foregoing methods includes automatically positioning the crossbar based on a load within a cargo bed of the vehicle.

Another exemplary embodiment of the foregoing method includes automatically positioning the crossbar based on a vertical height of the load.

Another exemplary embodiment of any of the foregoing methods includes using a passenger side mounting bracket to couple an end portion of the crossbar to the passenger side rail and using a driver side mounting bracket to couple the other end portion of the crossbar to the driver side rail. The passenger side mounting bracket has a portion slidably received within the passenger side rail. The driver side mounting bracket has a portion slidably received within the driver side rail.

In another exemplary embodiment of any of the foregoing methods, the passenger side rail and the driver side rail are disposed vertically beneath the upper side of the passenger and driver side wall assemblies.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a crossbar utilized in connection with a cargo bed of a vehicle. The crossbar can be slidably coupled to rail assemblies. The crossbar can be repositioned to accommodate particular loads by sliding the crossbar along the rails. The repositioning of the crossbar along the rails can be automatic.

Figure 1:
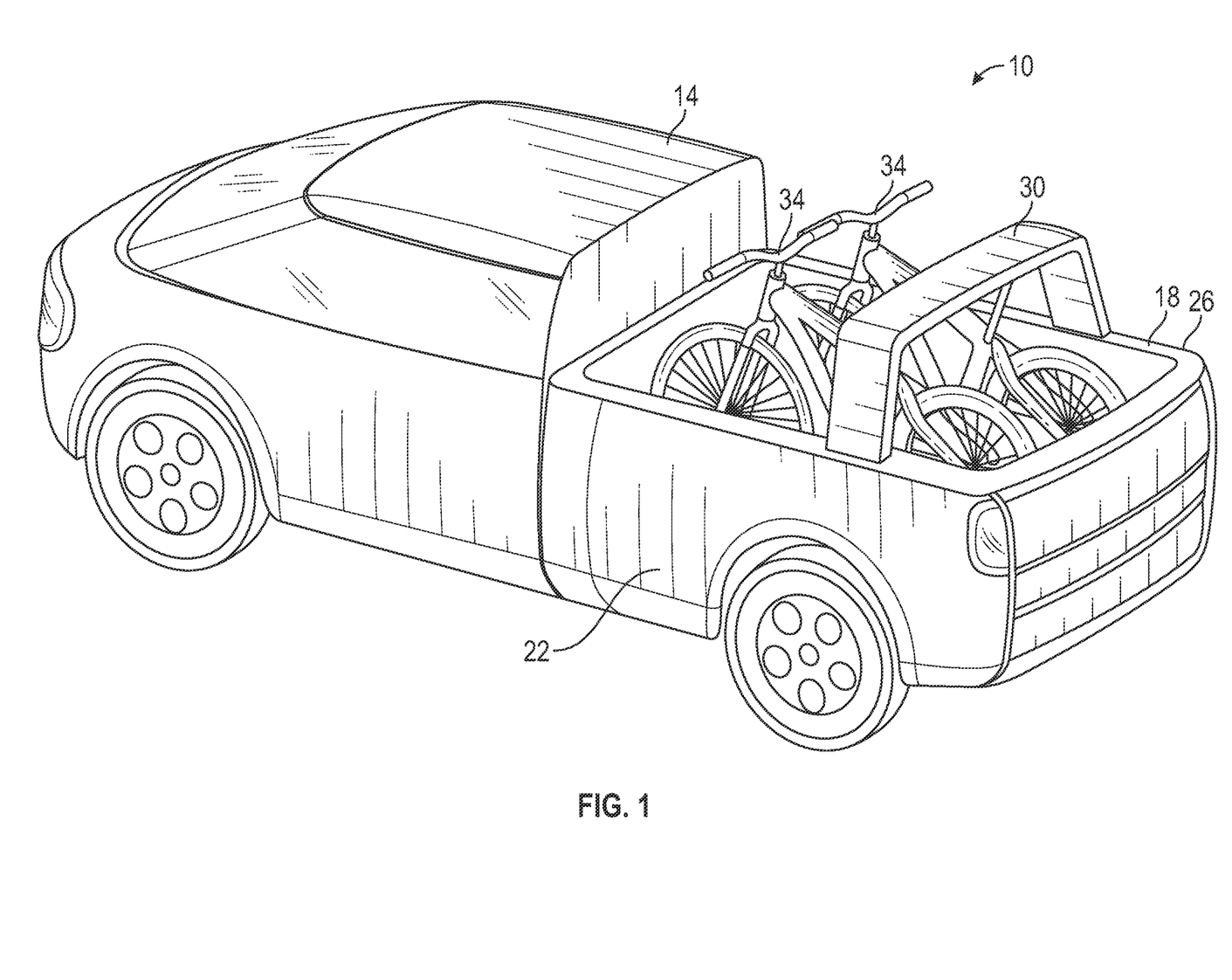
FIG. 1 illustrates a perspective view of a vehicle having a cargo bed and a crossbar.

With reference to FIG. 1, an exemplary vehicle 10 includes a cab 14 and a cargo bed 18 that is aft the cab 14. The vehicle 10 is a pickup truck in this example.

The cargo bed 18 includes a driver side wall assembly 22 and a passenger side wall assembly 26. A crossbar 30 extends from the driver side wall assembly 22, over the cargo bed 18, to the passenger side wall assembly 26. The crossbar 30 can be utilized to secure a load 34 within the cargo bed 18. The load 34 can be tied to the crossbar 30, for example.

Figure 2:
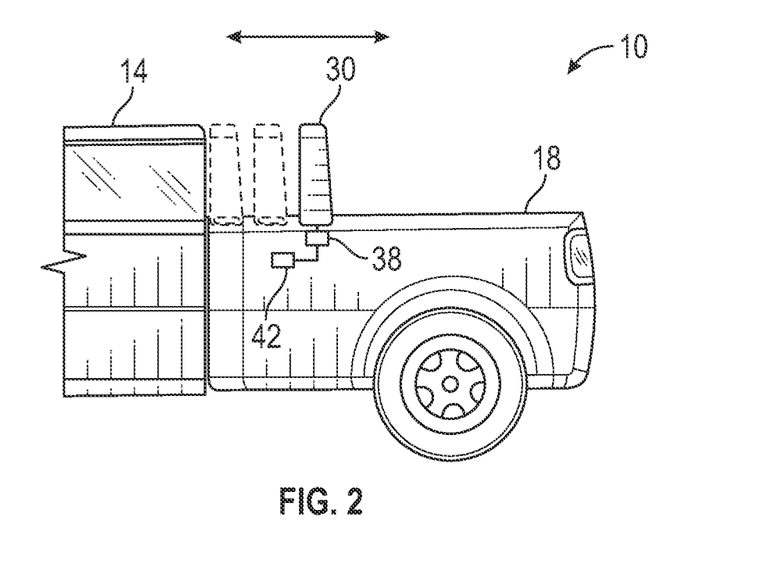
FIG. 2 illustrates a side view of a portion of the vehicle in FIG. 1.

With reference to FIG. 2, the crossbar 30 can be repositioned by sliding between forward positions and rearward positions along a length of the cargo bed 18. The crossbar 30 can be repositioned to, for example, facilitate securing load 34.

The vehicle 10, in this example, includes an actuator assembly 38 and a control module 42. In response to commands from the control module 42, the actuator assembly 38 can move the crossbar 30 forward and aft along the cargo bed 18.

The control module 42 is shown schematically in FIG. 2. It should be understood that the control module 42 may include hardware and software, and could be part of an overall vehicle control module, such as a battery on-board control module, or vehicle system controller (VSC), or could alternatively be a standalone controller separate from VSC.

In an example embodiment, some of the operations of the control module 42 described herein may be performed by separate control modules, such as the on-board control module, and vehicle control module. In this regard, the control module 42 may include one or more of an on-board control module and vehicle control module.

The control module 42 can be programmed with executable instructions for interfacing with and operating the various components of the vehicle 10. The control module 42 can include a processing unit and non-transitory memory for executing the various control strategies and modes. In an example, the control module 42 includes, as memory, electrically erasable programmable read-only memory (EEPROM), which is a type of non-volatile memory often used in computers and remote keyless systems. EEPROMs can be programmed and erased in circuit by applying special programming signals, which may be sent by the control module 42.

In an example, the actuator assembly 38 includes a motor within the driver side wall assembly 22 and another motor within the passenger side wall assembly 26. The motors can be used to drive forward and rearward movements of the crossbar 30. The motors may include a mechanical break to hold a position of the crossbar 30.

In particular, the actuator assembly 38 associated with the driver side wall 22 can comprise a DC motor that drives a screw mechanism through a set of reduction gears. The driving or rotating of the screw mechanism by the DC motor moves a platform or base along the driver side wall 22. The crossbar 30 is secured directly to the platform or base. Another DC motor, screw mechanism, and set of reduction gears are associated with the passenger side wall 22 and used to drive the passenger side of the crossbar. While an exemplary type of actuator assembly 38 is described above, other options for moving the crossbar 30 are contemplated and fall within the scope of this disclosure.

The actuator assembly 38 can be activated by the control module 42 in response to a command from a user. The command causes the actuator assembly 38 to move the crossbar 30. The command may be sent through a smart device, such as a smart phone. In another example, the user interacts with a touchscreen inside the cab 14 to cause the control module to initiate the command.

Figure 3:
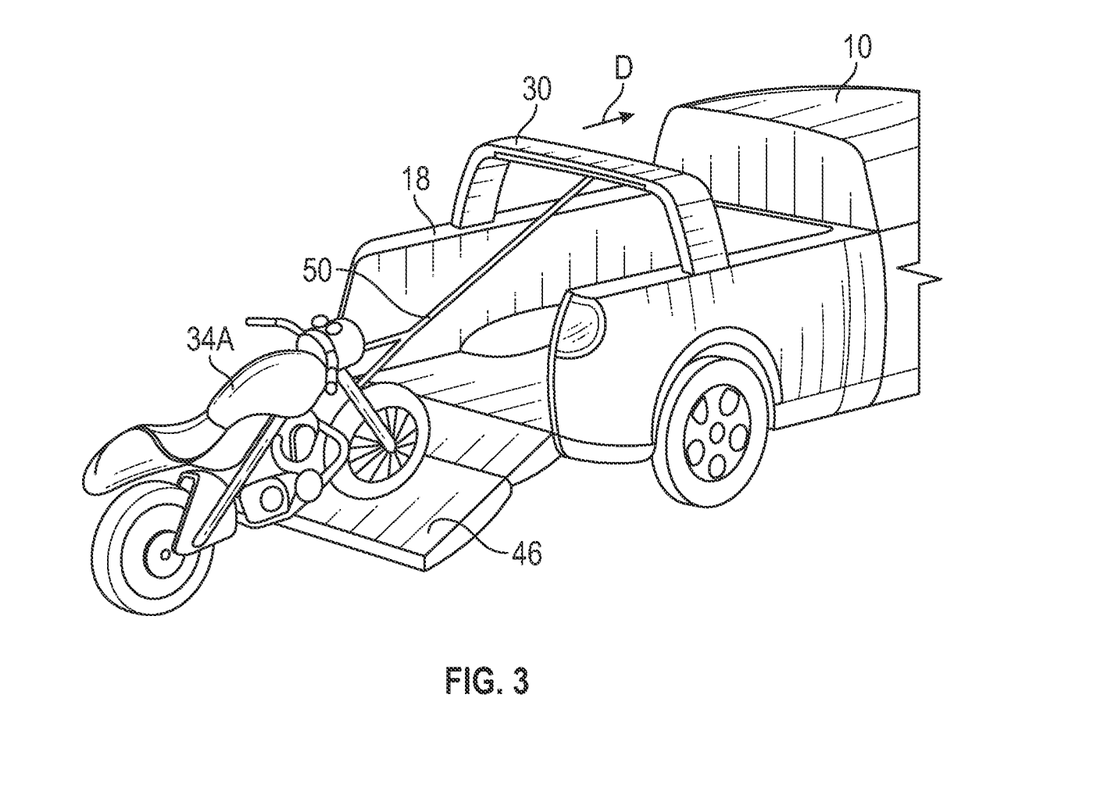
FIG. 3 illustrates a perspective view of a portion of the vehicle of FIG. 1 as the crossbar is being used to move a load into the cargo bed.

With reference to FIG. 3, the crossbar 30 can, in some examples, be moved to help move a load 34A into the cargo bed 18. In this example, a tailgate 46 of the vehicle 10 is first lowered. The load 34A is then tethered to the crossbar 30 utilizing a rope or cable 50. Next, the actuator assembly 38 is activated to move the crossbar 30 forward in the direction D, which pulls the cable 50 to pull the load 34A up the tailgate 46 into the cargo bed 18.

In some examples, a winch, such as a gantry-style winch, can be mounted to the crossbar 30 and can be used to pull the cable 50. The winch could be slidable back-and-forth along the crossbar 30 to facilitate positioning the winch for certain operations, or to provide clearance for items loaded in the cargo bed 18. More than one winch could be used to pull the load 34A. The crossbar 30 can be moved along the rails 70 while the winch is pulling the load 34A. This can keep the angle of the pulling parallel to the tailgate 46 until the front wheels of the load 34A crest the tailgate 46 or the crossbar 30 has moved forward as far as possible.

Figure 4:
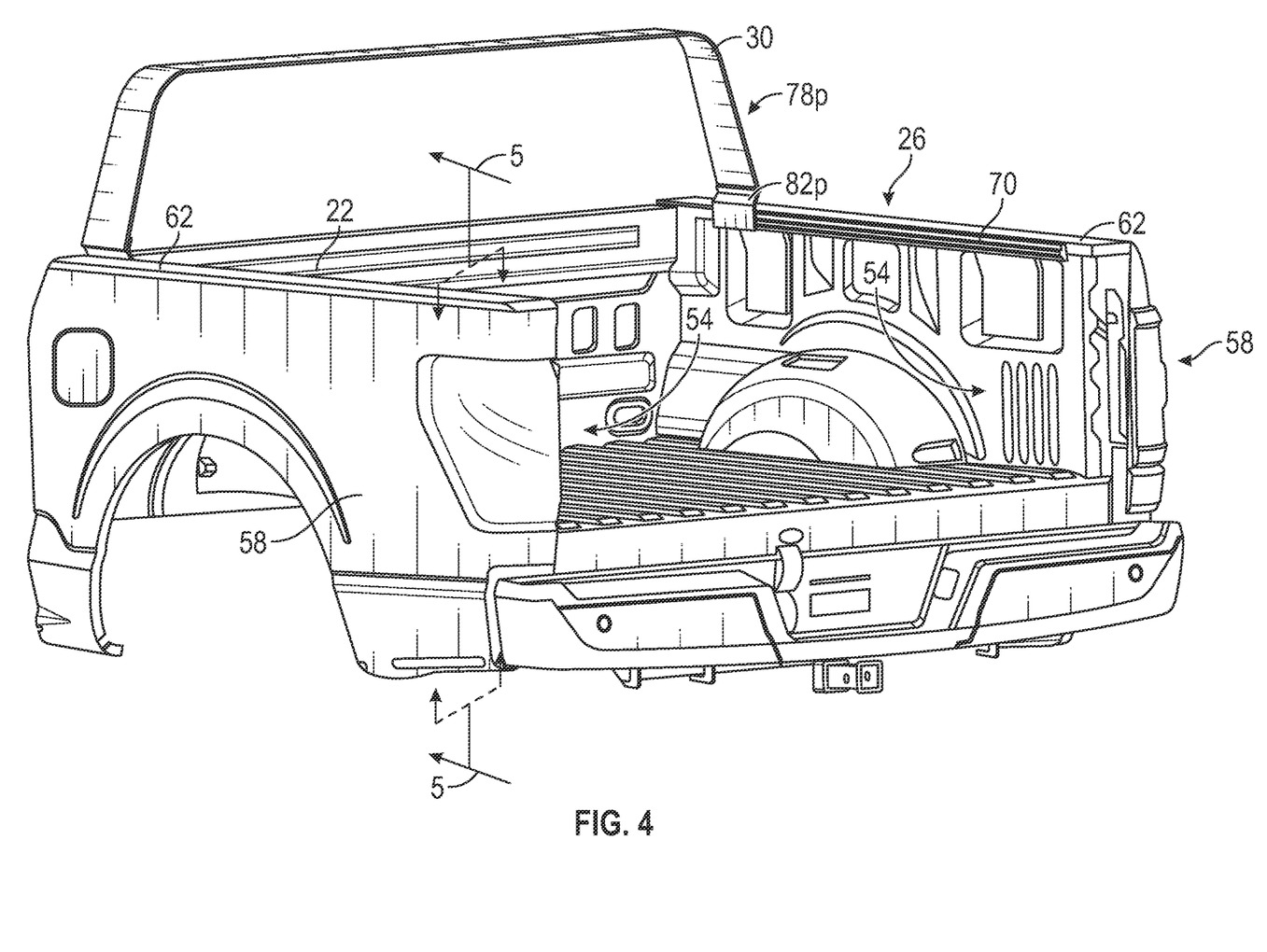
FIG. 4 illustrates a perspective view of the crossbar and cargo bed of FIG. 1 with selected portions removed.
Figure 5:
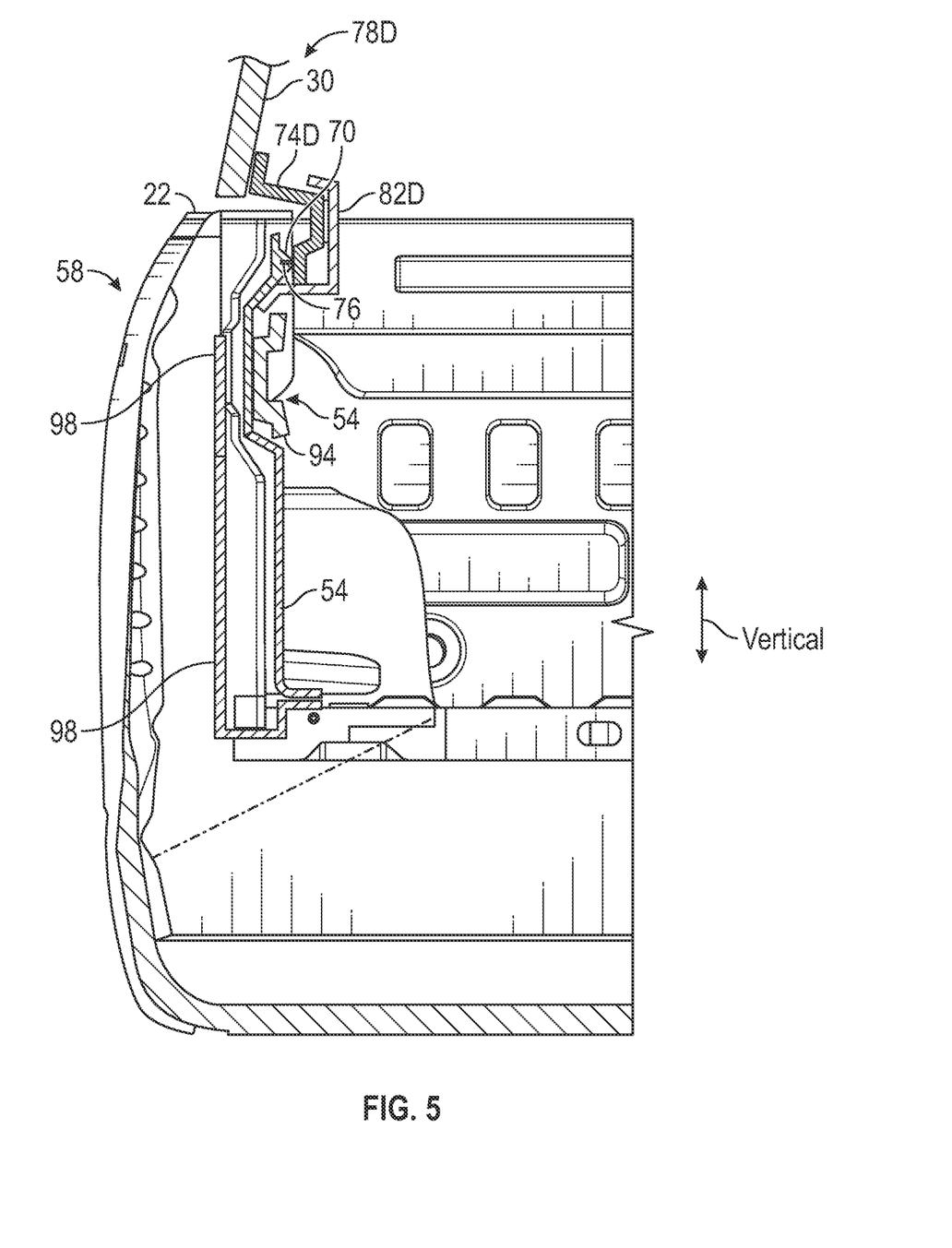
FIG. 5 illustrates a section view taken at line 5-5 in FIG. 4.

With reference now for FIGS. 4 and 5, the driver side wall assembly 22 and the passenger side wall assembly 26 each include an inner side 54, an outer side 58, and an upper side 62. A rail 70 is mounted to the inner side 54 of the driver side wall assembly 22. Another rail 70 is mounted to the inner side 54 of the passenger side wall assembly 26.

To slidably couple the crossbar 30 to the rails 70, a driver side mounting bracket 74D couples an end portion 78D of the crossbar 30 to the driver side rail 70. A passenger side mounting bracket couples a passenger side end portion 78P of the crossbar 30 to the passenger side rail 70.

The driver side mounting bracket 74D has a portion slidably coupled to the driver side rail 70. The passenger side mounting bracket 74P has a portion slidably coupled to the passenger side rail 70. In this example, the mounting brackets 74D engages with the rail 70 through a roller and bushing assembly 76, which can transfer a load from the crossbar 30 to the respective rail 70.

A cover 82D conceals at least part of the mounting bracket 74D and the roller and bushing assembly 86. The cover 82D can help to protect these components from dirt and damage The cover 82D can allow wiring (e.g., wiring used to power the actuator assembly 38) to travel in a manner similar to that of a sliding door on conventional vehicles while protecting the wiring. Another cover 82P conceals at least part of the mounting bracket on the passenger side along with the associated roller and bushing assembly.

The rail 70 can mount directly to the inner sides 54 of the driver side wall assembly 22 and the passenger side wall assembly 26. The rail 70 may mount to existing cargo management tie down locations and structural parts for automobiles sold under the BOXLINK® name.

In the exemplary embodiment, the rails 70 are mounted such that the rails 70 are vertically beneath the upper sides 62 of the driver side wall assembly 22 and the passenger side wall assembly 26. This helps to hide the rails 70 from view. All portions of the crossbar 30, in this example, are vertically above the upper sides 62. Vertical, for purposes of this disclosure, is with reference to ground and an ordinary orientation of the vehicle 10 during operation.

In this example, with reference to FIG. 5, the rail 70 is mounted to the inner side 54 of the driver side wall assembly 22. After which, a tie down 94 can be secured to the inner side 54 and the rail 70. The tie down 94 can be used to help secure a load within the cargo bed 18.

In this example, reinforcement structures 98 are used to reinforce the inner sides 54 of the driver side wall assembly 22 and the passenger side wall assembly 26. The reinforcement structures 98 can be referred to as doublers. The reinforcement structures 98 strengthen the areas of the driver side wall assembly 22 and the passenger side wall assembly 26, particularly the areas where the rails 70 are attached.

Some vehicles have outer sides 58 that are removable. In such vehicles, the outer side can be removed from the driver side wall assembly 22 to permit the reinforcement structures 98 to be attached to the backside of the inner side 54 of the passenger side wall assembly 22. In vehicles without removable outer sides, the outer side 58 can include openings to permit access and clearances necessary to install the reinforcement structures 98.

Figure 6:
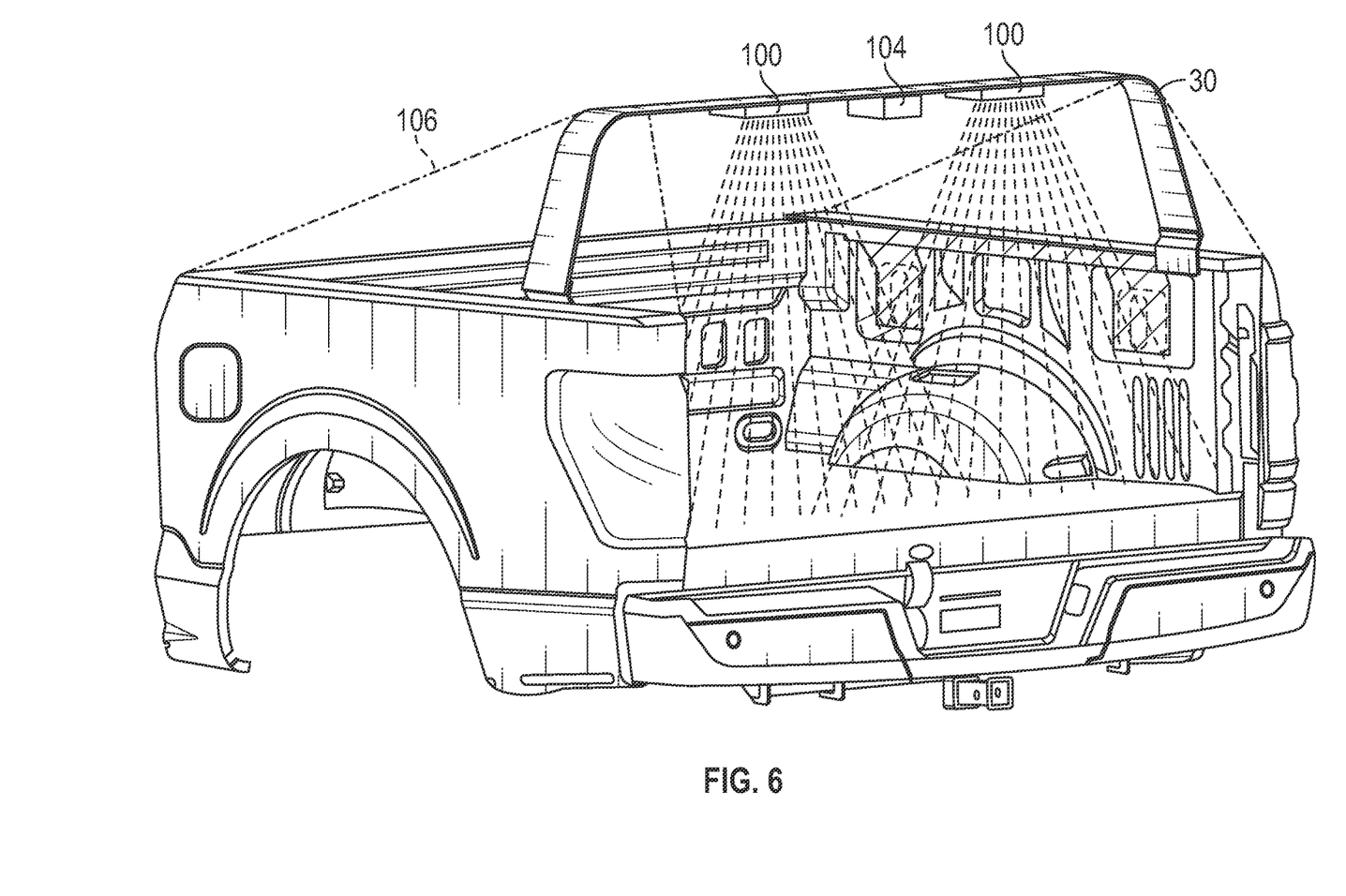
FIG. 6 illustrates a perspective view of the cargo bed and crossbar when the crossbar includes lights.

With reference now to FIG. 6, in an embodiment, at least one light assembly 100 is mounted to the crossbar 30. In this example, the at least one light assembly 100 is configured to shine down into the cargo bed 18. Repositioning the crossbar 30 repositions the at least one light assembly 100 that is mounted to the crossbar 30.

In the embodiment of FIG. 6, a camera 104 is also mounted to the crossbar 30. The example camera 104 includes a radar sensor. Field of view for the camera and its radar sensor can be changed by moving the crossbar 30 fore and aft within the vehicle 10. The camera 104 and its sensor can be used to facilitate positioning the crossbar 30 in a position appropriate for supporting a load. In FIG. 6, the crossbar 30 is additionally used as a support for a tent 106.

Figure 7:
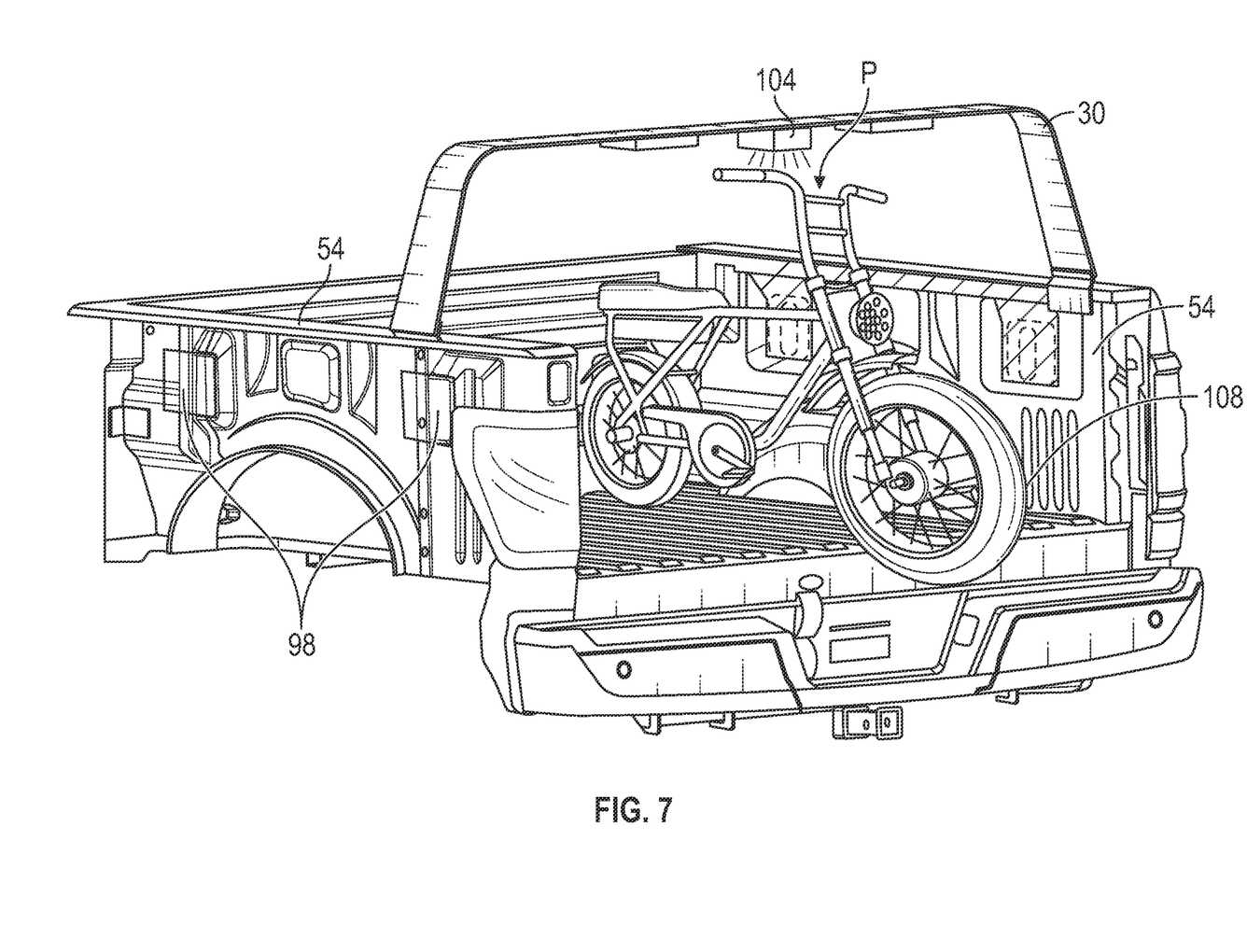
FIG. 7 illustrates a perspective view of the cargo bed and crossbar when the cargo bed is carrying a load.

For example, with reference to FIG. 7, the radar sensor of the camera 104 can scan a load 108. Based on the information from the radar sensor, the control module 42 can operate the actuator assembly 38 to reposition the crossbar 30 over a vertically highest point P or apex of the load 108. Often, the point P is portion of load 108 most likely to be secured directly to the crossbar 30. In the FIG. 7 embodiment, tying the load 108, here a bicycle, to the crossbar holds the load 108 and prevents the load 108 from banging against the inner sides 54. Automatically repositioning the crossbar 30 over the point P can facilitate rapid loading and securing of the load 108.

Any example method of tying down the load includes a user touching a button on a smartphone or smart device. In response, the radar sensor scans the load. The crossbar 30 then moves forward from a stowed position to a use position where the crossbar 30 is positioned over the point P. The user then ties the load 108 to the crossbar 30.

Features of the disclosed examples include a slidable crossbar that can be repositioned automatically in the position appropriate for supporting a load. The crossbar, along with the associated driver and passenger side rails, can be an aftermarket item in some examples.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a cargo bed of a vehicle;
   a passenger side rail mounted to a passenger side wall assembly of the cargo bed;
   a driver side rail mounted to a driver side wall assembly of the cargo bed;
   a crossbar slidably coupled to the passenger and driver side rails, the crossbar slidable along the passenger and driver side rails between a forward position and a rearward position, the crossbar closer to a cab of the vehicle when the crossbar in the forward position than when the crossbar is in the rearward position; and
   a control module and an actuator assembly, the control module configured to control the actuator assembly to reposition the crossbar, wherein the control module is configured to control the actuator assembly to position the crossbar vertically above a vertically highest point of a load held within the cargo bed, and further comprising a device configured to assess the load to reveal information identifying the vertically highest point of the load.

2. The vehicle assembly of claim 1,
   wherein the passenger and driver side wall assemblies each have an inner side, an outer side, and an upper side, wherein the passenger side rail is mounted directly to the inner side of the passenger side wall assembly, wherein the driver side rail is mounted directly to the inner side of the driver side wall assembly,
   wherein the passenger side rail and the driver side rail are disposed vertically beneath the upper sides of the passenger and driver side wall assemblies.

3. The vehicle assembly of claim 1, further comprising at least one light mounted to the crossbar, the at least one light configured to illuminate the cargo bed.

4. The vehicle assembly of claim 1, further comprising a plurality of reinforcement structures within the passenger side wall between inner and outer sides of the passenger side wall, and still further comprising a plurality of reinforcement structures within the driver side wall between inner and outer sides of the driver side wall.

5. The vehicle assembly of claim 4, wherein the plurality of reinforcement structures within the passenger side wall and within the driver side wall are installable from outside the cargo bed.

6. The vehicle assembly of claim 1, further comprising a passenger side mounting bracket and a driver side mounting bracket secured to opposing end portions of the crossbar, the passenger side mounting bracket having a portion slidably received within the passenger side rail, the driver side mounting bracket having a portion slidably received within the driver side rail.

7. The vehicle assembly of claim 1, wherein the crossbar has a U-shaped profile.

8. A vehicle assembly, comprising:
a cargo bed of a vehicle;
a passenger side rail mounted to a passenger side wall assembly of the cargo bed;
a driver side rail mounted to a driver side wall assembly of the cargo bed;
a crossbar slidably coupled to the passenger and driver side rails, the crossbar slidable along the passenger and driver side rails between a forward position and a rearward position, the crossbar closer to a cab of the vehicle when the crossbar in the forward position than when the crossbar is in the rearward position;
a control module and an actuator assembly, the control module configured to control the actuator assembly to reposition the crossbar; and
a radar device configured to scan a load to reveal information identifying the vertically highest point of the load.

9. The vehicle assembly of claim 8, wherein the radar device is disposed on the crossbar.

10. A vehicle crossbar operating method, comprising:
slidably coupling a crossbar to both a passenger side rail and a driver side rail, the passenger side rail mounted to an inner side of a passenger side wall assembly, the driver side rail mounted to an inner side of a driver side wall assembly;
sliding the crossbar along the passenger and driver side rails between a forward position and a rearward position, the crossbar closer to a cab of a vehicle when the crossbar is in the forward position than when the crossbar is in the rearward position; and
automatically positioning the crossbar based on a load within a cargo bed of the vehicle.

11. The vehicle crossbar operating method of claim 10, further comprising sliding the crossbar over a cargo bed of the vehicle when moving the crossbar between the forward position and the rearward position.

12. The vehicle crossbar operating method of claim 10, wherein the crossbar has a U-shaped profile.

13. The vehicle crossbar operating method of claim 10, further comprising automatically positioning the crossbar based on a vertical height of the load.

14. The vehicle crossbar operating method of claim 10, further comprising using a passenger side mounting bracket to couple an end portion of the crossbar to the passenger side rail, and using a driver side mounting bracket to couple another end portion of the crossbar to the driver side rail, the passenger side mounting bracket having a portion slidably received within the passenger side rail, the driver side mounting bracket having a portion slidably received within the driver side rail.

15. The vehicle crossbar operating method of claim 10, wherein the passenger side rail and the driver side rail are disposed vertically beneath an upper side of the passenger and driver side wall assemblies.

* * * * *